US010936826B2

(12) United States Patent
Liu et al.

(10) Patent No.: US 10,936,826 B2
(45) Date of Patent: Mar. 2, 2021

(54) PROACTIVE DATA BREACH PREVENTION IN REMOTE TRANSLATION ENVIRONMENTS

(71) Applicant: International Business Machines Corporation, Armonk, NY (US)

(72) Inventors: Su Liu, Austin, TX (US); Qin Qiong Zhang, Beijing (CN); Syed I. Haiderzaidi, Round Rock, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/008,901

(22) Filed: Jun. 14, 2018

(65) Prior Publication Data

US 2019/0384820 A1    Dec. 19, 2019

(51) Int. Cl.
| *G06F 40/40* | (2020.01) |
| *G06F 21/60* | (2013.01) |
| *G06N 20/00* | (2019.01) |

(52) U.S. Cl.
CPC ............ *G06F 40/40* (2020.01); *G06F 21/606* (2013.01); *G06N 20/00* (2019.01)

(58) Field of Classification Search
CPC .... G06F 17/289; G06F 17/2836; G06F 17/28; G06F 21/60; G10L 15/26; G10L 40/40; G10L 40/55; G10L 40/56; G10L 40/58; G06N 99/00
See application file for complete search history.

(56) References Cited

U.S. PATENT DOCUMENTS

| 6,823,203 | B2 | 11/2004 | Jordan |
| 7,181,017 | B1* | 2/2007 | Nagel .................. H04L 9/0825 |
| | | | 380/282 |
| 7,363,361 | B2 | 4/2008 | Tewari et al. |
| 7,707,433 | B2* | 4/2010 | Rice ...................... G06F 21/629 |
| | | | 713/194 |

(Continued)

FOREIGN PATENT DOCUMENTS

CN            103095530 A        5/2013

OTHER PUBLICATIONS

D. E. Bakken, R. Rarameswaran, D. M. Blough, A. A. Franz and T. J. Palmer, "Data obfuscation: anonymity and desensitization of usable data sets," in IEEE Security & Privacy, vol. 2, No. 6, pp. 34-41, Nov.-Dec. 2004.*
Wang et al., "Generalizing PIR for practical private retrieval of public data." IFIP Annual Conference on Data and Applications Security and Privacy. Springer, Berlin, Heidelberg, 2010; 16 pages.

(Continued)

*Primary Examiner* — Edgar X Guerra-Erazo
(74) *Attorney, Agent, or Firm* — Patterson + Sheridan, LLP

(57) ABSTRACT

Techniques for proactive prevention of data breaches are provided. A first text segment corresponding to a sensitive entity is identified in a string of text, based on one or more security profiles. The first text segment in the string of text is replaced with a first entity holder. A first translation is generated by processing the string of text with a first translation service, and a second translation is generated by processing the first text segment with a second translation service, distinct from the first translation service. The first and second translations are merged to produce a final translation, where merging the first and second translations comprises removing the first entity holder from the final translation.

20 Claims, 6 Drawing Sheets

(56) References Cited

U.S. PATENT DOCUMENTS

| | | | |
|---|---|---|---|
| 7,730,528 B2* | 6/2010 | Chun | H04L 69/08 726/12 |
| 7,996,891 B2* | 8/2011 | Cardone | G06F 21/33 726/10 |
| 8,214,363 B2 | 7/2012 | Chaudhary | |
| 9,002,696 B2 | 4/2015 | Kraenzel et al. | |
| 9,317,501 B2 | 4/2016 | Kraenzel et al. | |
| 9,904,729 B2 | 2/2018 | Sweeney et al. | |
| 10,460,407 B2* | 10/2019 | Robinson | G09B 21/006 |
| 2002/0004900 A1* | 1/2002 | Patel | G06Q 30/02 713/155 |
| 2003/0188184 A1 | 10/2003 | Strongin et al. | |
| 2005/0036681 A1 | 2/2005 | Lenoir | |
| 2012/0159577 A1* | 6/2012 | Belinkiy | G06F 21/6218 726/4 |
| 2014/0082362 A1* | 3/2014 | Walker | H04L 9/3273 713/169 |
| 2015/0244690 A1* | 8/2015 | Mossbarger | H04L 9/006 713/171 |
| 2015/0379276 A1 | 12/2015 | Glickman et al. | |
| 2016/0063269 A1* | 3/2016 | Liden | G06F 21/6254 726/26 |
| 2016/0162478 A1* | 6/2016 | Blassin | G06Q 10/063112 706/12 |
| 2017/0104756 A1 | 4/2017 | Rosenthal et al. | |
| 2018/0069888 A1 | 3/2018 | Muddu et al. | |

OTHER PUBLICATIONS

Fournet et al. "ZQL: A Compiler for Privacy-Preserving Data Processing." USENIX Security Symposium. 2013, 17 pages.

May et al., "Privacy APIs: Access control techniques to analyze and verify legal privacy policies." Computer Security Foundations Workshop, 2006, 19th IEEE. IEEE, 2006, 15 pages.

Abbas et al. "The Role of Data Mining in Information Security." International Journal of Computer (IJC) 17.1 (2015): 1-20.

Verykios et al. "State-of-the-art in privacy preserving data mining." ACM Sigmod Record 311 (2004): 50-57.

Sathiyapriya et al., "A survey on privacy preserving association rule mining." International Journal of Data Mining & Knowledge Management Process 32 (2013): 119.

CJK Dictionary Institute, Inc., "Contextual Clues for Named Entity Recognition in Japanese," 2002-2011, 3 pages. [Accessed Online, Jun. 13, 2018] <http://www.cjk.org/cjk/samples/necc.htm>.

Chinese-Tools.com, "Your name in Chinese," [Accessed Online, Jun. 13, 2018] <http://www.chinese-tools.com/names/search.html>.

Protected Health Information (HIPAA) [Accessed Online, Jun. 13, 2018] <https://www.safecomputing.umich.edu/dataguide/?q=node/61>.

North Dakota University System, "Classification of Common Data Elements," [Accessed Online Jun. 13, 2018] 3 pages, <http://www.ndus.edu/uploads/resources/5799/classification-of-common-data-elements.pdf>.

* cited by examiner

PROACTIVE DATA BREACH PREVENTION IN REMOTE TRANSLATION ENVIRONMENTS

BACKGROUND

The present invention relates to proactively preventing data breaches, and more specifically, to masking translation requests in order to prevent data breaches.

Increasingly, data security is playing an important role in many data systems. Data security is particularly important when operating utilizing remote resources or services which are not within the control of the local network. For example, utilizing remote services (such as for storage, translations, processing, and the like) can pose significant risks because potentially confidential data must be transmitted over a network and to remote servers. Often, the security of both the network transmission and the remote servers cannot be assured. When these remote services are compromised, data breaches frequently occur, which causes significant problems for entities (i.e., corporations, individuals, educational facilities, governmental entities, and the like) that rely on these remote services. However, in many instances, it is not possible to simply decline to use remote services. For example, translation services are tremendously important for a wide variety of entities, and it is not possible to implement local services with an acceptable level of quality. Thus, in existing systems, there is inherent and unavoidable risk of data breaches.

SUMMARY

According to one embodiment of the present disclosure, a method is provided. The method includes identifying, in a string of text, a first text segment corresponding to a sensitive entity, based on one or more security profiles. The method further includes replacing the first text segment in the string of text with a first entity holder. Additionally, the method includes generating a first translation by processing the string of text with a first translation service, and generating a second translation by processing the first text segment with a second translation service, distinct from the first translation service. Finally, the method includes merging the first and second translations to produce a final translation, wherein merging the first and second translations comprises removing the first entity holder from the final translation.

According to a second embodiment of the present disclosure, a computer program product is disclosed. The computer program product includes a computer-readable storage medium having computer-readable program code embodied therewith, the computer-readable program code executable by one or more computer processors to perform an operation. The operation includes identifying, in a string of text, a first text segment corresponding to a sensitive entity, based on one or more security profiles. The operation further includes replacing the first text segment in the string of text with a first entity holder. Additionally, the operation includes generating a first translation by processing the masked string of text with a first translation service, and generating a second translation by processing the first text segment with a second translation service, distinct from the first translation service. Finally, the operation includes merging the first and second translations to produce a final translation, wherein merging the first and second translations comprises removing the first entity holder from the final translation.

According to a third embodiment of the present disclosure, a system is provided. The system includes one or more computer processors, and a memory containing a program which when executed by the one or more computer processors performs an operation. The operation includes identifying, in a string of text, a first text segment corresponding to a sensitive entity, based on one or more security profiles. The operation further includes replacing the first text segment in the string of text with a first entity holder. Additionally, the operation includes generating a first translation by processing the string of text with a first translation service, and generating a second translation by processing the first text segment with a second translation service, distinct from the first translation service. Finally, the operation includes merging the first and second translations to produce a final translation, wherein merging the first and second translations comprises removing the first entity holder from the final translation.

DETAILED DESCRIPTION

Many data services are complex and require large amounts of data to operate accurately and effectively. These aspects make it impractical to implement these services on local systems. For example, an entity (such as a business, governmental entity, educational facility, or individual) may utilize powerful remote translation services, such as provided in a Software as a Service (SaaS) model. These powerful translation services, however, typically cannot be implemented locally, as they require large amounts of data, excessive computing resources, as well as extensive maintenance. Thus, in order to ensure quality translations, entities are effectively forced to rely on translation services provided by one or more third parties. However, these external services are unverifiable, in that each user cannot always confirm the security of the systems performing the translations. The translations are performed by devices that the user cannot inherently trust, because the translation systems operate remotely and outside of the trusted system maintained by the user.

For example, many entities maintain trusted systems (such as an intranet), where each device allowed on the intranet is a "secure" or "trusted" device, and each service provided by the intranet is a "secure" or "trusted" service. Any device or system outside of this trusted system is often considered to be "unverified," "unsecure," or "untrusted." Therefore, in order to prevent data breach, entities may forbid the use of external services that may or may not be secure. However, for many entities, it is impractical to forbid the use of external translation services, because they are required for daily operations. Embodiments of the present disclosure enable proactive data breach prevention that allows for the use of unverified external services, without risking compromise of secure or confidential data. To do so, in an embodiment, a trusted system identifies sensitive entities in data that is to be transmitted to an untrusted or unverified system. For example, names, socials security numbers, and the like may be identified as secure or sensitive entities. In an embodiment, these sensitive entities are replaced with entity holders, and the masked data is then transmitted to the unverified system. In this way, data confidentiality is maintained because no sensitive information leaves the trusted system. In an embodiment, when the results of the external processing are returned, the identified sensitive entities can be merged back into the received data in order to create a unified final result without risk of data breach.

Figure 1:
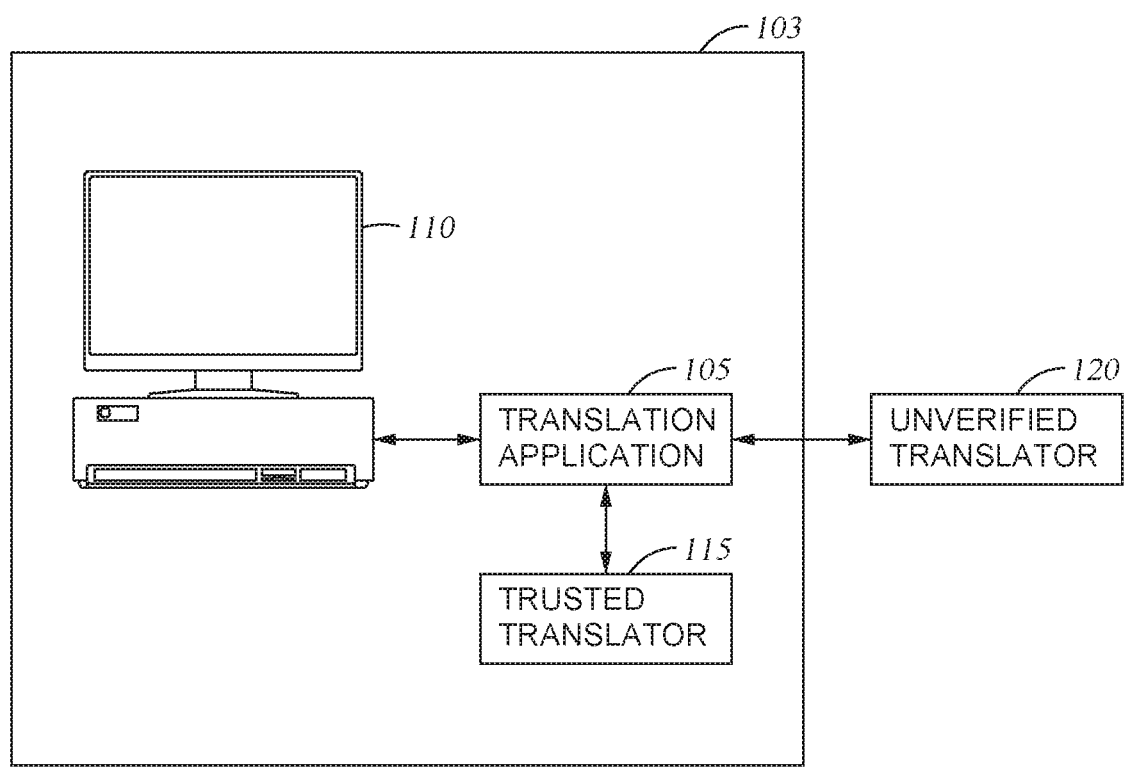
FIG. 1 illustrates a system configured for proactive data breach prevention, according to one embodiment disclosed herein.

FIG. 1 illustrates a system 100 configured for proactive data breach prevention, according to one embodiment disclosed herein. The illustrated system 100 includes a Trusted System 103, and an Unverified Translator 120, which are communicatively coupled. For example, the Unverified Translator 120 may operate as part of a translation service on one or more remote servers or devices that are external to the Trusted System 103. In an embodiment, the Unverified Translator 120 executes as a cloud service offered by one or more providers. Notably, although the Unverified Translator 120 is referred to as "unverified," "untrusted," or "unsecure," the Unverified Translator 120 may in fact be secure. For example, the provider of the Unverified Translator 120 may implement any number of measures to ensure security of the data it processes, such as through encryption, promises or guarantees, and the like. In an embodiment, regardless of how secure the Unverified Translator 120 actually is, it is still considered "unverified," "untrusted," or "unsecured" by the Trusted System 103, because it is not within the domain or control of the Trusted System 103.

Although a single Unverified Translator 120 is illustrated, in embodiments, there may be any number of external services (for translation and for other services) which are reachable by the Trusted System 103. In the illustrated embodiment, the Trusted System 103 includes a Client Device 110, a Translation Application 105, and a Trusted Translator 115. Although a single Client Device 110 is illustrated, there may of course be any number of Client Devices 110 in the Trusted System 103. Similarly, although translation services are discussed, embodiments of the present disclosure may be implemented with any number of computing services, and are not limited to translation. In embodiments, the Client Device 110 may be a computer, mobile device, or any other computing device that operates within the Trusted System 103. In an embodiment, a user of the Client Device 110 transmits translation requests to the Translation Application 105. In various embodiments, the Translation Application 105 may execute on one or more computing devices within the Trusted System 103. In some embodiments, the Translation Application 105 may be a local application on the Client Device 110. In other embodiments, the Translation Application 105 operates on a trusted server which is reachable by Client Devices 110.

In an embodiment, the Translation Application 105 identifies sensitive entities in the translation request, and replaces them with entity holders. In one embodiment, this masked request is then transmitted to one or more external unverified services, such as the Unverified Translator 120. In the illustrated embodiment, the sensitive entities are transmitted to a Trusted Translator 115 for translation. In some embodiments, the Trusted Translator 115 is included within the Translation Application 105. In some embodiments, the Trusted Translator 115 executes on one or more trusted devices within the Trusted System 103. In some embodiments, the Trusted Translator 115 operates on a remote device, but is still considered to be secure and trusted by administrators of the Trusted System 103 (e.g., because of business agreements or any other factors).

In some embodiments, the Trusted Translator 115 is a relatively simplistic translator, which provides, for example, translations for sensitive entities based on predefined translations and without considering context of the sensitive entity. For example, in an embodiment, the Trusted Translator 115 may receive individual sensitive entities (e.g., words or phrases) such as "John Doe" and translate them based on predefined translation pairs or dictionaries, without consideration of the words or phrases that surround the sensitive entity. In this way, the Trusted Translator 115 can be maintained by administrators and users of the Trusted System 103, because it is less complex than a full translation service. In contrast, in an embodiment, the Unverified Translator 120 may receive full sentences and lengthy excerpts which must be translated with consideration of the context. For example, a full sentence cannot be translated by simply translating each word individually. Rather, the sentence must be translated as a whole, with consideration of the surrounding words and phrases. In this way, the Unverified Translator 120 may require significantly more resources to produce quality translations.

In one embodiment, when the Unverified Translator 120 and Trusted Translator 115 return their respective translations, the Translation Application 105 merges the translations in order to generate a final translation. This translation may then be returned to the Client Device 110. In this way, embodiments of the present disclosure provide for improved data security without sacrificing high quality translations. In an embodiment, by utilizing the Trusted Translator 115, the computing resources required in the Trusted System 103 are significantly reduced because the intensive work is offloaded to one or more Unverified Translation Systems 120. Further, introduction of the Trusted Translator 115 provides enhanced data security and prevents data breaches in the Trusted System 103 in embodiments of the present disclosure. In this way, the Trusted System 103 is itself improved by increased security and reduced resource consumption. Similarly, service to users of the Trusted System 103 is improved because increased data security is provided without incurring significant additional costs.

Figure 2:
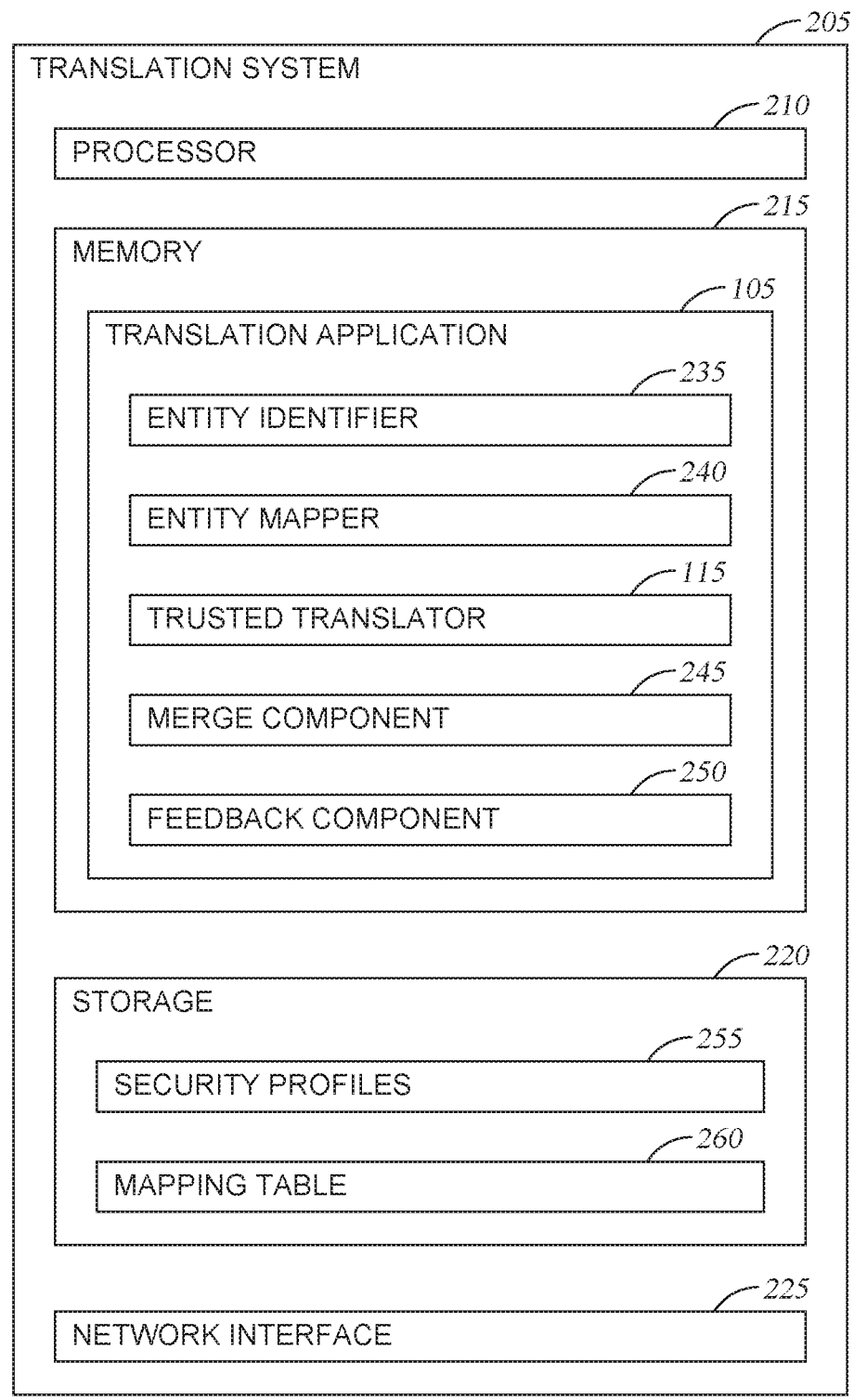
FIG. 2 is a block diagram illustrating a translation system configured for proactive data breach prevention, according to one embodiment disclosed herein.

FIG. 2 is a block diagram illustrating a Translation System 205 configured for proactive data breach prevention, according to one embodiment disclosed herein. In the illustrated embodiment, the Translation System 205 operates within a trusted environment, such as the Trusted System 103. As illustrated, the Translation System 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Translation System 205 may be communicatively coupled with other devices, including Client Devices 110, Unverified Translators 120, and the like.

Although illustrated as a single device, the Translation System 205 may operate across multiple devices in various embodiments. In the illustrated embodiment, the Storage 220 includes a number of Security Profiles 255, and one or more Mapping Tables 260. The Security Profiles 255 are generally used to identify sensitive entities, as will be described in more detail below. The Mapping Table 260 is used to maintain a mapping between identified sensitive entities and their corresponding entity holders, as will be discussed in more detail below. Although illustrated as residing in Storage 220, in embodiments, each of the Security Profiles 255 and Mapping Tables 260 may additionally or alternatively reside in Memory 215, on the requesting Client Device 110, or any other location.

In the illustrated embodiment, the Memory 215 includes a Translation Application 105. The Translation Application 105 includes an Entity Identifier 235, an Entity Mapper 240, a Trusted Translator 115, a Merge Component 245, and a Feedback Component 250. Although illustrated as software components executing within the Memory 215, in some embodiments, each of these components may be implemented as hardware or software, and may reside on any device, either local or remote from the Translation System 205. The Translation Application 105 receives translation requests from users. In an embodiment, each of these translation requests includes one or more strings of text to be translated into one or more other languages. In some embodiments, the translation request may include information indicating the source and/or target language(s) or target locale(s). In some embodiments, translation requests may also include one or more security profiles, which may be used to supplement or to replace the predefined Security Profiles 255 for purposes of the requested translation. In some embodiments, the translation requests may also include an indication as to the translation service(s) to use, both trusted and untrusted. In some embodiments, the translation request may also include one or more predefined translations for sensitive entities, such as a preferred translation for a person's name.

In an embodiment, the Entity Identifier 235 parses the received strings of text to identify sensitive entities based on the Security Profiles 255. In some embodiments, the user may also provide an indication of one or more sensitive entities in the translation request, in order to aid the process. In some embodiments, the Security Profiles 255 may include rules for identifying sensitive entities. For example, a Security Profile 255 may specify one or more rules that are used to identify proper nouns, names, job titles, addresses, and the like. In some embodiments, one or more Security Profiles 255 may correspond to one or more machine learning models generated via supervised machine learning. For example, training exemplars may be used, where each training exemplar includes a word or phrase, and an indication of whether the word or phrase corresponds to a sensitive entity. In some embodiments, one or more machine learning models may similarly be trained to not only identify sensitive entities, but also to identify the type of each sensitive entity is present in the provided text.

In some embodiments, each Security Profile 255 corresponds to a particular type of sensitive entity. For example, in an embodiment, there may be a separate Security Profile 255 for names, social security numbers, license numbers, addresses, account numbers, credit cards or other financial information, healthcare data, birth date or location, gender, education records, job titles, statistics, phone numbers, and the like. In other embodiments, however, each Security Profile 255 may include rules or models for multiple types of entities. In some embodiments, the Entity Identifier 235 determines which Security Profiles 255 to apply based on an indication included in the translation request. For example, depending on the level of security required, one or more Security Profiles 255 may be applied or ignored by the Entity Identifier 235 when parsing the text. In some embodiments, an administrator may define certain Security Profiles 255 as mandatory such that they are always applied, while the rest remain applicable at the option of the user. In an embodiment, the Entity Identifier 235 may identify and tag portions of the textual string that correspond to sensitive entities. For example, the Entity Identifier 235 may modify or generate metadata describing the locations and length of each identified portion of text that includes sensitive information.

In one embodiment, once the sensitive entities have been identified, the Entity Mapper 240 may generate an entity holder for each entity, associate the holder and the sensitive entity, and maintain the Mapping Table(s) 260 based on this association. Although described as a table, in embodiments, the Mapping Table 260 may be any collection of records capable of implementing the functionality described herein. In embodiments, the Mapping Table 260 includes a number of records, each record corresponding to a particular sensitive entity identified in a translation request. For example, in some embodiments, each record includes the text of the sensitive entity, as well as the corresponding entity holder that the Entity Mapper 240 assigned. In an embodiment, the Mapping Table 260 may also include an indication as to the translation request, string, or document that the entity was found in, as well as the corresponding location in the document.

In some embodiments, the entity holder is a textual string that can be used to hold the place of the sensitive entity in the input document or string. For example, a name such as "John Doe" may be assigned an entity holder corresponding to a string such as "XYZ0001." In such an embodiment, the Entity Mapper 240 may extract and store the string "John Doe" in the Mapping Table 260, along with the corresponding generated entity holder of "XYZ0001." Further, the Entity Mapper 240 may insert this entity holder into the translation request string, at the corresponding location. In some embodiments, the Entity Mapper 240 generates a unique entity holder for each sensitive entity, regardless of the type of entity or source of the translation request. In such an embodiment, the Mapping Table 260 need only include the original text, as well as the generated entity holder, as will be discussed in more detail below.

Once each sensitive entity has been replaced with an entity holder, the Translation Application 105 may transmit the sensitive entities to the Trusted Translator 115, and the masked string to one or more Unverified Translator 120. In some embodiments, the Translation Application 105 also includes an indication as to one or more target languages, a source language, and any other relevant information. In an embodiment, the Trusted Translator 115 translates the sensitive entities individually based on predefined translation pairs, language dictionaries, and the like. In some embodiments, some predefined types of sensitive entities may bypass translation entirely. For example, numerical data or other data that cannot or should not be translated may be stored in the Mapping Table 260, but not provided to either translation service. Once translations have been returned from each service, the Merge Component 245 merges the translations into a final unified translation.

In an embodiment, the Merge Component 245 utilizes the Mapping Table 260 to identify the entity holders in the returned translation from the unverified translator, and replace each of them with the corresponding sensitive entity. In one embodiment, the Merge Component 245 may simply replace one or more of the entity holders with the original sensitive entity from the Mapping Table 260. In some embodiments, the Merge Component 245 may identify the original sensitive entity corresponding to each entity holder, and then identify the corresponding translation provided by the Trusted Translator 115 for that sensitive entity. In this way, the Merge Component 245 generates the final unified translation that includes translated sensitive entities, without the sensitive entities ever leaving the Trusted System 103. In some embodiments, the Merge Component 245 also removes each record from the Mapping Table 260 upon replacing each entity holders with the corresponding sensitive entity translation. The final translation can then be returned to the requesting entity.

In the illustrated embodiment, the Feedback Component 250 may receive any feedback from the requesting entity or user, and modify the Translation System 205 as required. In some embodiments, when the final translation is returned, an indication as to the sensitive entities that were identified is included. In this way, the requesting entity can determine whether any words or phrases were incorrectly identified as sensitive, or whether any sensitive entities slipped past the Security Profiles 255 and were transmitted to the unverified system. In one embodiment, the Feedback Component 250 may receive feedback regarding the quality or accuracy of the translation, as well as the identification of sensitive entities. For example, in one embodiment, a user may determine that the translation provided by the remote unverified translation service is inaccurate, and provide feedback indicating the mistranslation. In some embodiments, the Feedback Component 250 may transmit this indication to the remote service, in order to improve its functionality.

Similarly, a user may determine that a particular sensitive entity was mistranslated, and provide feedback indicating this mistranslation. In some embodiments, the user may also include the correct translation. In such an embodiment, the Feedback Component 250 may update the Trusted Translator 115 based on this feedback, so that future translations of the sensitive entity and other sensitive entities can be improved. Additionally, a user may determine that one or more sensitive entities were not identified, and were therefore transmitted to the unverified service, or that one or more non-sensitive words or phrases were flagged as sensitive, and translated with the Trusted Translator 115. In an embodiment, the user can provide an indication of these misidentifications. The Feedback Component 250 may then utilize this feedback to update or refine the Security Profiles 255, such as by adding, removing, or modifying one or more rules, or by using the feedback to further train or refine one or more machine learning models.

Figure 3:
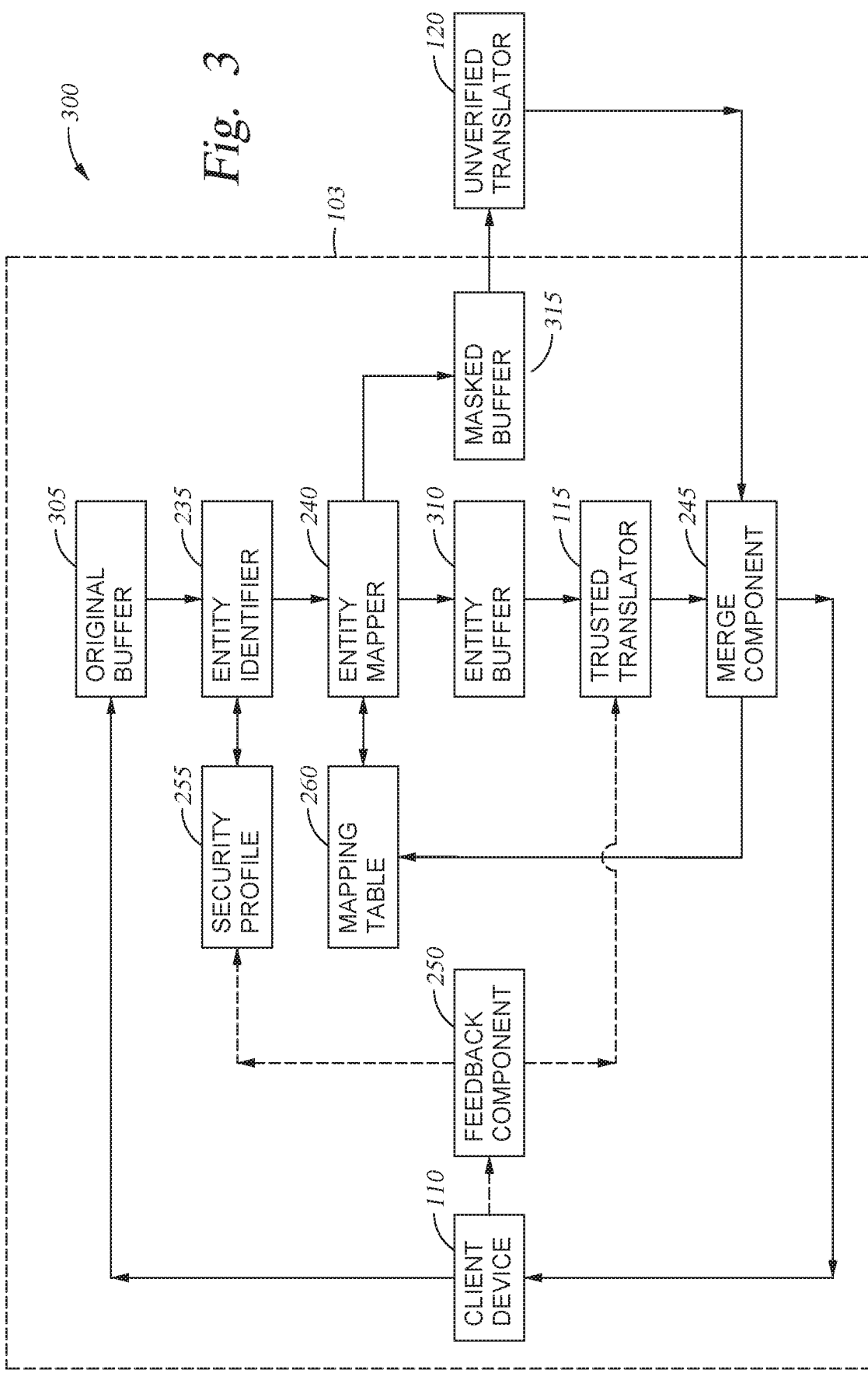
FIG. 3 is a diagram illustrating a workflow for proactive data breach prevention, according to one embodiment disclosed herein.

FIG. 3 is a diagram illustrating a workflow 300 for proactive data breach prevention, according to one embodiment disclosed herein. In the illustrated workflow 300, data flows between and among components of a Trusted System 103, as well as to and from one or more Unverified Translators 120. As illustrated, the workflow 300 begins when a Client Device 110 transmits a translation request to the Translation System 205, where it is received by an Original Buffer 305. This transmission may be wired, wireless, or a combination of both. The data is then passed to the Entity Identifier 235, which utilizes the Security Profiles 255 to identify sensitive entities in the text of the translation request. As discussed above, the Entity Identifier 235 may further tag or flag these sensitive entities for downstream processing.

The tagged text string(s) is then passed to the Entity Mapper 240, which generates an entity holder for each sensitive entity, replaces each sensitive entity with the generated entity holder, and stores these associations in the Mapping Table 260. In an embodiment, the operations of the Entity Mapper 240 result in a set of sensitive entities to be translated, as well as a masked string or document. In an embodiment, the string is "masked" because sensitive entities have been replaced by entity holders, as discussed herein. The masked string is then received by a Masked Buffer 315, where it awaits to be transmitted out of the Trusted System 103 to the Unverified Translator 120. Similarly, the identified sensitive entities are stored in an Entity Buffer 310 until they can be translated by the Trusted Translator 115.

As discussed above, in an embodiment, the Trusted Translator 115 translates each sensitive entity separately (i.e., without considering any context or other words or phrases). In some embodiments, the Trusted Translator 115 updates the Mapping Table 260 to include the generated translation for each sensitive entity. When the Unverified Translator 120 completes the translation, the resulting translated string is returned and received by the Merge Component 245. The Merge Component 245 may then identify the entity holders in the translated string and replace them with their corresponding translated sensitive entities, based on the Mapping Table 260. As discussed above, in some embodiments, certain types of sensitive entities (such as numerical values or data) may bypass translation, and be merged back into the results without translation.

As illustrated, the final translation results are then returned to the Client Device 110. In the illustrated embodiment, the Client Device 110 (e.g., an application or user of the Client Device 110) may provide feedback via the Feedback Component 250. Depending on the particular feedback, the Feedback Component 250 may update or refine the Security Profiles 255, Trusted Translator 115, or both. Similarly, in some embodiments, the Feedback Component 250 may also transmit feedback to the Unverified Translator 120, as needed. In an embodiment, updating or refining the Security Profiles 255 may include identifying one or more Security Profiles 255 that are implicated in the feedback. The Feedback Component 250 may then add, remove, or modify one or more rules included in the identified Security Profiles 255, based on the feedback.

Similarly, in some embodiments, the Feedback Component 250 may refine one or more machine learning models based on the feedback. For example, a user may provide an indication of a particular word or phrase, as well as an indication as to whether the word or phrase is or is not a sensitive entity (potentially also indicating the type of entity). The Feedback Component 250 may then use this data as additional training exemplars for one or more machine learning models. In an embodiment updating or refining the Trusted Translator 115 may include adding, removing, or modifying a translation pair corresponding to the sensitive entity that the user is providing feedback for. For example, the user may notice that a name has been mistranslated, and provide the correct translation. The Feedback Component 250 may then update the Trusted Translator 115 based on this new correct translation.

Figure 4:
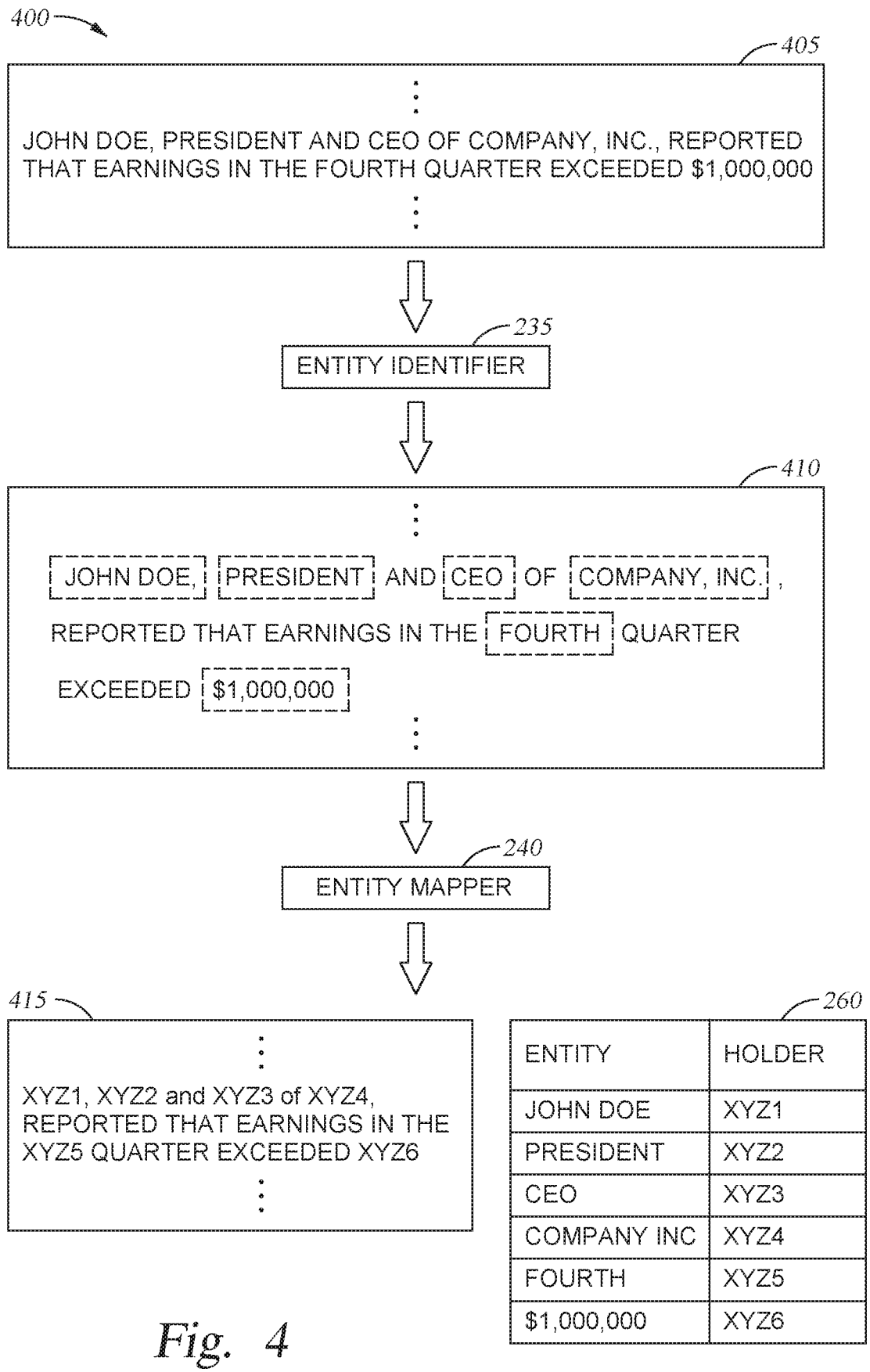
FIG. 4 illustrates a workflow for proactive data breach prevention, according to one embodiment disclosed herein.

FIG. 4 illustrates a workflow 400 for proactive data breach prevention, according to one embodiment disclosed herein. The workflow 400 begins when a segment or string of text is received, as indicated in block 405. In some embodiments, the string of text may include all or a portion of a document. For example, in some embodiments, a user may provide a document for translation, and the Translation System 205 may identify and extract one or more strings of text from the document. For purposes of illustration, a single sentence is illustrated and discussed with reference to FIG. 4. However, as illustrated by the ellipses above and below the sample string, the string may be any length in various embodiments, and need not be a single complete sentence. Further, in some embodiments, multiple related strings (i.e., from a single document) may be processed similarly. In the illustrated embodiment, at least a portion of the received string reads "John Doe, President and CEO of Company, Inc., reported that earnings in the fourth quarter exceeded $1,000,000."

As illustrated, the received string of text is provided to the Entity Identifier 235, which identifies any sensitive entities in the string. For example, as discussed above, the Entity Identifier 235 may use one or more Security Profiles 255 describing sensitive entities, in order to identify the sensitive entities in the text. In embodiments, the Security Profiles 255 may include a number of rules, one or more trained machine learning models, or a combination of both. The string of text is illustrated with each identified sensitive entity highlighted by a dashed-line rectangle, in block 410. In the illustrated embodiment, the Entity Identifier 235 identified "John Doe," "President," "CEO," "Company, Inc.," "fourth," and "$1,000,000" as sensitive entities. As discussed above, various sensitive entities may include names, titles, occupations, numbers or statistics (e.g., social security numbers, banking information, and the like), and the like. In some embodiments, users or administrators may also define their own sensitive entities types, as well as provide examples of specific sensitive entities. These examples and types may be used to generate or modify rules in the Security Profiles 255, or to train or refine one or more machine learning models in the Security Profiles 255.

In the illustrated embodiment, the sensitive entities are indicated by a dashed-line box. In embodiments, the sensitive entities may be identified in a number of ways, such as via one or more metadata tags included with the string as it passes to the Entity Mapper 240. In some embodiments, however, the Entity Identifier 235 and Entity Mapper 240 operate on the string at the same time. For example, in some embodiments, as each sensitive entity is identified by the Entity Identifier 235, it is immediately replaced by an entity holder by the Entity Mapper 240. In such an embodiment, there may be no need to associate additional tags or data with the string.

As illustrated, the Entity Mapper 240 receives the string and identified sensitive entities, generates an entity holder for each sensitive entity, and replaces each sensitive entity with its corresponding entity holder to generate a masked string in block 415. Similarly, in an embodiment, the Entity Mapper 240 generates or updates a Mapping Table 260 based on the entity holder and sensitive entity mappings generated by the Entity Mapper 240. In the illustrated Mapping Table 260, the sensitive entity corresponding to "John Doe" corresponds to the entity holder "XYZ1," "President" has been assigned entity holder "XYZ2," and so on. In some embodiments, each entity holder is simply a string (e.g., a series of characters) that can be inserted into the input string to create a masked string. In an embodiment, the string used as the entity holder may be designed such that it cannot be translated by typical translation services. For example, the entity holder may appear to be gibberish or may include what appears to be a random string of characters. This prevents the translation service from attempting to translate the entity holder, which may cause difficulty when merging the translations. In other embodiments, each entity holder may be one or more other data structures.

In the illustrated embodiment, the Mapping Table 260 includes two entries for each record: one for the identified sensitive entity, and one for the corresponding entity holder. In some embodiments, however, the Mapping Table 260 may have additional fields. For example, in one embodiment, each record or row in the Mapping Table 260 may include an indication as to the source document or string. In some embodiments, the Mapping Table 260 may also include information about the corresponding request, such as an indication as to the entity (e.g., user) who transmitted the request, when the request was received, the size of the request, string, or document, any other documents or projects the request is associated with, and the like.

Additionally, in the illustrated embodiment, each sensitive entity holder has an identical prefix (i.e., "XYZ") followed by a unique number. In some embodiments, the value of each entity holder may vary based on various factors. In one embodiment, the entity holder may be based in part on the type of the corresponding sensitive entity. For example, in an embodiment, sensitive entities that correspond to a person's name may include "PERSON_," while sensitive entities that include statistics may include "STAT_." In some embodiments in which administrators or users can define their own sensitive entity types, the entity holders may similarly be affected. For example, an administrator may define a "planned product" sensitive entity, a "formula" sensitive entity, and the like. In such an embodiment, the entity holder for each may reflect each entity type.

In some embodiments, the entity holder may also be generated based at least in part on the source of the corresponding sensitive entity. For example, in one embodiment, if the sensitive entity is from a document "ABC" which is associated with a project "DEF," and the request was submitted by a user "John," the corresponding entity holder may include this information, such as "ABC_DEF_John_1," and so on. Of course, in embodiments, the entity holder may include some arbitrary string (such as "ABC") rather than the actual name used for various projects, documents, and users. For example, sensitive entities found in documents associated with a "merger" project may be assigned entity holders that include "ABC," while sensitive entities associated with a "planned product release" project may be assigned entity holders that include "JKL."

In some embodiments, prior to generating an entity holder for the identified sensitive entity, the Entity Mapper 240 may determine whether the sensitive entity is already present in the Mapping Table 260. For example, suppose the input string includes "the CEO of Company, Inc. has been in communications with the CEO of Incorporated, Ltd. regarding potential merger." In one embodiment, both instances of the sensitive entity "CEO" may be replaced by the same entity holder. In an embodiment, the Entity Mapper 240 may accomplish this by searching the Mapping Table 260 for the current sensitive entity. If it is found in the Mapping Table 260, the corresponding entity holder may be used. If not, a new entry for the sensitive entity can be generated and entered into the Mapping Table 260.

In some embodiments, entity holders may only be reused within a single document or translation request, within a single project, and the like. Thus, in some embodiments, each sensitive entity receives a unique entity holder and each entity holder corresponds to a particular sensitive entity, but each entity holder may correspond to multiple instances of the same sensitive entity. In one embodiment, the Mapping Table 260 may similarly include one or more fields indicating how many times the sensitive entity has been found and replaced with the corresponding entity holder.

Once the masked text 415 has been generated, it is sent to a translator service, such as the Unverified Translator 120. Because the context of each word in the string remains largely intact, the Unverified Translator 120 can translate the string normally. Additionally, each sensitive entity is translated separately by the Trusted Translator 115. As discussed above, in some embodiments, some sensitive entities may bypass translation. For example, in one embodiment, any numerical data (e.g., "10") may bypass translation. In some embodiments, values such as currency or measures (e.g., "$1,000,000," "10 acres," "five pounds," and the like) may be converted to the measurement system of the target region. In some embodiments, the user or administrator may specify particular sensitive entities or entity types which should bypass translation.

The results of each can then be merged by the Merge Component 245 to generate the final translation. As discussed above, in some embodiments, the Merge Component 245 parses the translated masked string to identify entity holders found in the Mapping Table 260. When one is found, it is replaced with the translation of the corresponding sensitive entity. In some embodiments, the record is then deleted from the Mapping Table 260. In embodiments that allow for entity holders to be reused, however, the Merge Component 245 may decrement a counter indicating how many instances of the entity holder remain in the translated string(s). In this way, once all of the entity holders have been found and replaced, the record can be deleted.

Figure 5:
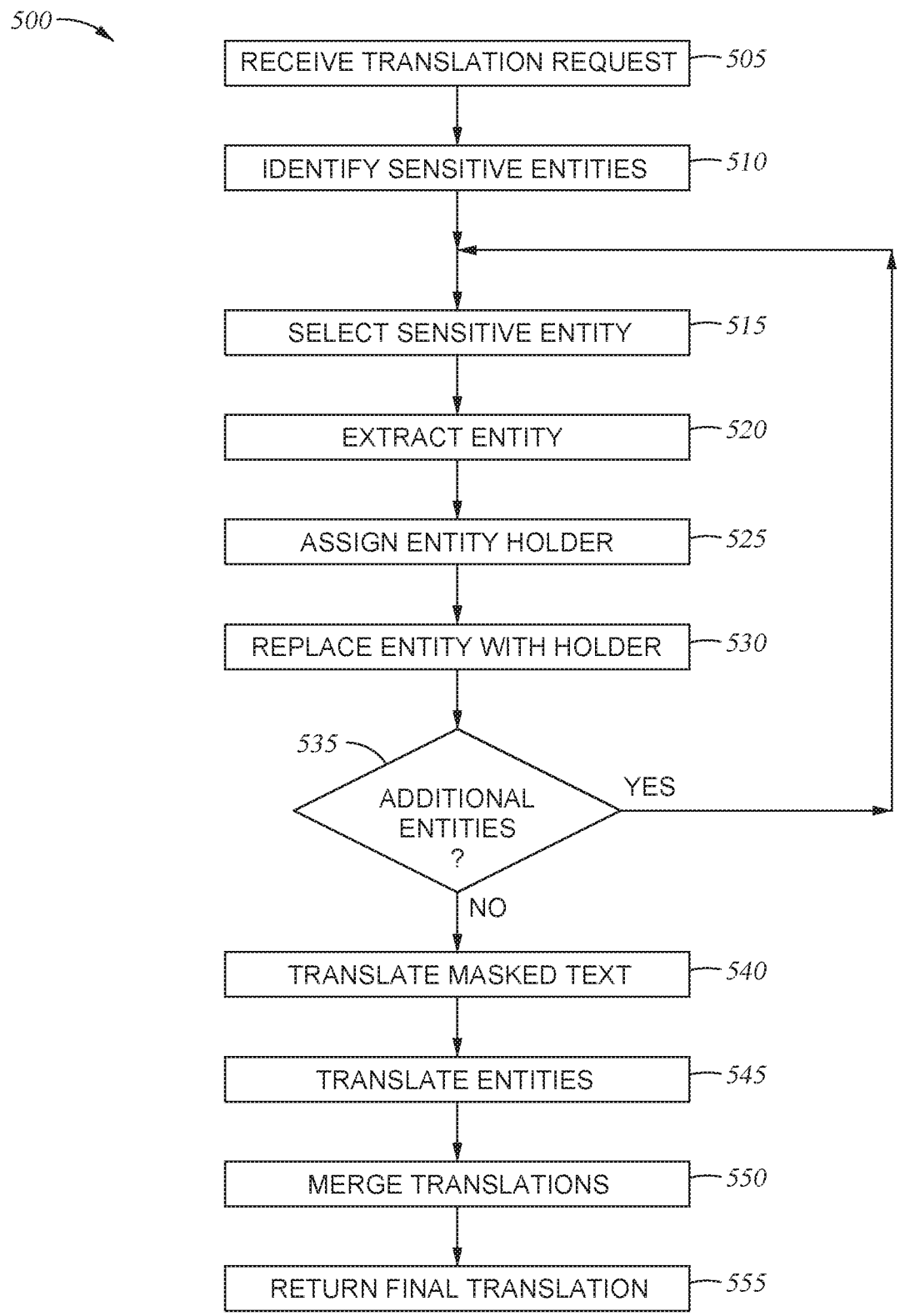
FIG. 5 is a flow diagram illustrating a method of proactive data breach prevention, according to one embodiment disclosed herein.

FIG. 5 is a flow diagram illustrating a method 500 of proactive data breach prevention, according to one embodiment disclosed herein. The method 500 begins at block 505, where the Translation System 205 receives a translation request. As discussed above, this translation request may include one or more strings of text (e.g., within a document). At block 510, the Entity Identifier 235 identifies any sensitive entities in the text. That is, the Entity Identifier 235 identifies portions or segments of the string that include sensitive entities. In some embodiments, the user may specify or flag sensitive entities before sending the translation request. In such an embodiment, the Entity Identifier 235 may identify each of these tagged entities as sensitive entities, even if the Security Profiles 255 do not flag the entity.

The method 500 then proceeds to block 515, where the Entity Mapper 240 selects a first sensitive entity. At block 520 the Entity Mapper 240 extracts the entity. That is, the Entity Mapper 240 extracts the identified segment of text. The method 500 then continues to block 525, where the Entity Mapper 240 assigns an entity holder to the selected sensitive entity. As discussed above, in one embodiment, this includes updating a Mapping Table 260 to reflect the association. Further, as discussed above, in some embodiments, this includes searching the Mapping Table 260 to determine whether the entity has already been assigned a holder. If so, the Entity Mapper 240 may reuse the identified holder. In other embodiments, or if the sensitive entity is not yet in the Mapping Table 260, the Entity Mapper 240 may generate an entity holder for the selected sensitive entity.

At block 530, the Entity Mapper 240 replaces the sensitive entity in the original source text with the assigned entity holder. In this way, a masked string is generated. The method 500 proceeds to block 535, where the Entity Mapper 240 determines whether there is at least one more additional sensitive entity to be processed. If so, the method returns to block 515. As discussed above, in some embodiments, the process of identifying a sensitive entity, assigning an entity holder, and replacing the entity with the holder may all occur sequentially for each identified sensitive entity, prior to proceeding to identify the next sensitive entity in the source text string. If no additional sensitive entities remain, the method 500 continues to block 540.

At block 540, the masked string is provided to a translator for translation. For example, in an embodiment, the masked string is transmitted to an Unverified Translator 120. At block 545, the sensitive entities are translated. As discussed above, in an embodiment, this involves providing the sensitive entities to a Trusted Translator 115. In some embodiments, some sensitive entities (or entity types) may be converted to a format or system used by a specified destination locale (e.g., converting from miles to kilometers), or may bypass translation entirely (e.g., "5"). Note however that if numerical data is spelled out (as in "seven" rather than "7"), translations may still be required. Similarly, in some embodiments, a user may specify particular entities or entity types to bypass translation.

Once all translations have been completed, the method 500 proceeds to block 550, where the Merge Component 245 merges the translations. In one embodiment, this process involves parsing the translated masked string and comparing it to the Mapping Table 260 to identify any entity holders in the string. For each identified entity holder, the corresponding translated sensitive entity is inserted and the entity holder is removed. In some embodiments, once the entity holder has been removed from the text, the corresponding entry in the Mapping Table 260 is removed by the Merge Component 245. In some embodiments which allow an entity holder to be used multiple times, however, the record in the Mapping Table 260 may be updated to reflect the removal of the holder. For example, in an embodiment, a value in the corresponding row is incremented each time the entity holder is inserted into a masked string. When the translated masked string is returned, this value can also be used as an indication of how many instances of the entity holder remain in the text, potentially across multiple translation requests or strings. If the value is greater than one, the value may be decremented. If the value is equal to one, the entry may be removed from the Mapping Table 260.

In some embodiments, the entries are not removed from the Mapping Table 260. For example, in some embodiments, a separate Mapping Table 260 is used for each translation request, and the table may be discarded entirely at the end of the merge process. In some embodiments, the Mapping Table 260 entries are maintained to potentially help facilitate future translations. Regardless, once the merge process has been completed, the Translation System 205 returns the final translation to the requesting entity.

Figure 6:
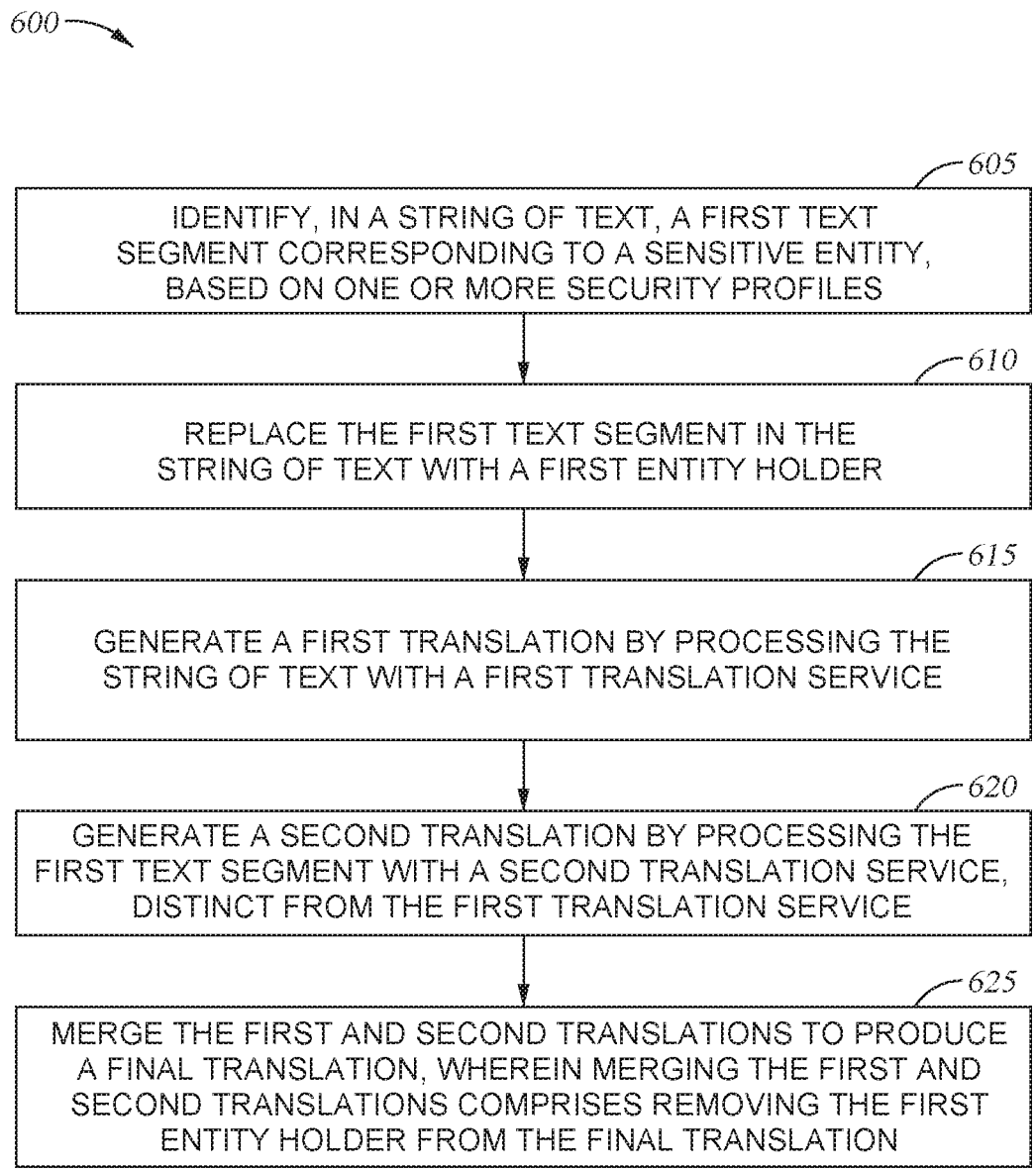
FIG. 6 is a flow diagram illustrating a method of proactive data breach prevention, according to one embodiment disclosed herein.

FIG. 6 is a flow diagram illustrating a method 600 of proactive data breach prevention, according to one embodiment disclosed herein. The method begins at block 605, where the Entity Identifier 235 identifies, in a string of text, a first text segment corresponding to a sensitive entity, based on one or more security profiles. At block 610, the Entity Mapper 240 replaces the first text segment in the string of text with a first entity holder. The method 600 then continues to block 615, where the Translation System 205 generates a first translation by processing the string of text with a first translation service. Similarly, at block 620, the Translation System generates a second translation by processing the first text segment with a second translation service, distinct from the first translation service. Finally, at block 625, the Merge Component 245 merges the first and second translations to produce a final translation, wherein merging the first and second translations comprises removing the first entity holder from the final translation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Translation Application 105) or related data available in the cloud. For example, the Translation Application 105 could execute on a computing system in the cloud and identify sensitive entities. In such a case, the Translation Application 105 could generate entity holders and store the Mapping Table 260 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   identifying, in a string of text, a first text segment corresponding to a sensitive entity, based on one or more security profiles;
   replacing the first text segment in the string of text with a first entity holder;
   generating a first translation by processing the string of text, including the first entity holder and not including the first text segment, with a first translation service;
   generating a second translation by processing the first text segment with a second translation service, distinct from the first translation service, wherein the second translation differs from the first text segment; and
   merging the first and second translations to produce a final translation, wherein merging the first and second translations comprises removing the first entity holder from the first translation and inserting the second translation into the first translation, wherein the first text segment is not included in the final translation.

2. The method of claim 1, wherein the second translation service is a secure service executing on a trusted device.

3. The method of claim 2, wherein the first translation service is an unverified service executing on an untrusted device.

4. The method of claim 1, wherein at least one of the one or more security profiles comprises a plurality of rules defining sensitive entities.

5. The method of claim 1, wherein at least one of the one or more security profiles comprises one or more machine learning models which have been trained based on exemplar sensitive entities.

6. The method of claim 1, wherein the sensitive entity corresponds to one of the following: (i) a name, (ii) a title, (iii) a phone number, (iv) an address, (v) statistical data, (vi) a social security number, or (vii) financial data.

7. The method of claim 1, wherein the string of text was provided by a first user, and wherein the one or more security profiles were selected based on input from the first user.

8. The method of claim 1, wherein replacing the first text segment in the string of text with the first entity holder is performed to generate a masked string of text, and wherein generating the first translation comprises transmitting the masked string of text to the first translation service, wherein the first translation service is configured to not process the first entity holder.

9. The method of claim 1, the method further comprising:
   replacing a second text segment in the string of text with a second entity holder; and
   during production of the final translation:
      removing the second entity holder from the first translation; and
      inserting the second text segment.

10. A computer program product comprising:
    a computer-readable storage medium having computer-readable program code embodied therewith, the computer-readable program code executable by one or more computer processors to perform an operation comprising:

identifying, in a string of text, a first text segment corresponding to a sensitive entity, based on one or more security profiles;

replacing the first text segment in the string of text with a first entity holder;

generating a first translation by processing the string of text, including the first entity holder and not including the first text segment, with a first translation service, wherein the first translation service is configured to not process the first entity holder;

generating a second translation by processing the first text segment with a second translation service, distinct from the first translation service, wherein the second translation differs from the first text segment; and merging the first and second translations to produce a final translation, wherein merging the first and second translations comprises removing the first entity holder from the first translation and inserting the second translation into the first translation, wherein the first text segment is not included in the final translation.

11. The computer program product of claim 10, wherein the second translation service is a secure service executing on a trusted device.

12. The computer program product of claim 11, wherein the first translation service is an unverified service executing on an untrusted device.

13. The computer program product of claim 10, wherein at least one of the one or more security profiles comprises one or more machine learning models which have been trained based on exemplar sensitive entities.

14. The computer program product of claim 10, wherein the string of text was provided by a first user, and wherein the one or more security profiles were selected based on input from the first user.

15. The computer program product of claim 10, wherein replacing the first text segment in the string of text with the first entity holder is performed to generate a masked string of text, and wherein generating the first translation comprises transmitting the masked string of text to the first translation service, wherein the first translation service is configured to not process the first entity holder.

16. A system comprising:
one or more computer processors; and
a memory containing a program which when executed by the one or more computer processors performs an operation, the operation comprising:

identifying, in a string of text, a first text segment corresponding to a sensitive entity, based on one or more security profiles;

replacing the first text segment in the string of text with a first entity holder;

generating a first translation by processing the string of text, including the first entity holder and not including the first text segment, with a first translation service, wherein the first translation service is configured to not process the first entity holder;

generating a second translation by processing the first text segment with a second translation service, distinct from the first translation service, wherein the second translation differs from the first text segment; and merging the first and second translations to produce a final translation, wherein merging the first and second translations comprises removing the first entity holder from the first translation and inserting the second translation into the first translation, wherein the first text segment is not included in the final translation.

17. The system of claim 16, wherein the second translation service is a secure service executing on a trusted device, and wherein the first translation service is an unverified service executing on an untrusted device.

18. The system of claim 16, wherein at least one of the one or more security profiles comprises one or more machine learning models which have been trained based on exemplar sensitive entities.

19. The system of claim 16, wherein the string of text was provided by a first user, and wherein the one or more security profiles were selected based on input from the first user.

20. The system of claim 16, wherein replacing the first text segment in the string of text with the first entity holder is performed to generate a masked string of text, and wherein generating the first translation comprises transmitting the masked string of text to the first translation service, wherein the first translation service is configured to not process the first entity holder.

* * * * *